(12) United States Patent
Shaneyfelt (10) Patent No.: US 6,745,006 B2
(45) Date of Patent: Jun. 1, 2004

(54) COMMUNICATION SYSTEM UTILIZING A CONSTELLATION OF SATELLITES AND METHOD THEREFOR

(75) Inventor: James T. Shaneyfelt, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 460 days.

(21) Appl. No.: 09/772,152

(22) Filed: Jan. 29, 2001

(65) Prior Publication Data

US 2002/0102939 A1 Aug. 1, 2002

(51) Int. Cl.$^7$ .............................................. H04B 7/185
(52) U.S. Cl. ...................... 455/13.1; 455/12.1
(58) Field of Search ...................... 455/12.1, 13.1, 455/13.2, 13.3, 427, 428, 429, 430; 370/315, 316, 326

(56) References Cited

U.S. PATENT DOCUMENTS

| | | | |
|---|---|---|---|
| 4,201,892 A | | 5/1980 | Schmidt ..................... 370/104 |
| 4,763,325 A | | 8/1988 | Wolfe et al. ................. 370/104 |
| 5,220,320 A | | 6/1993 | Assal et al. ............. 340/825.79 |
| 5,408,237 A | | 4/1995 | Patterson et al. ............. 342/354 |
| 5,615,407 A | * | 3/1997 | Barkats ...................... 455/13.1 |
| 5,722,042 A | * | 2/1998 | Kimura et al. .............. 455/13.1 |
| 5,896,558 A | * | 4/1999 | Wiedeman ................. 455/12.1 |
| 5,956,619 A | * | 9/1999 | Gallagher et al. ......... 455/12.1 |
| 6,002,360 A | * | 12/1999 | Wolcott et al. ............. 342/354 |
| 6,064,859 A | * | 5/2000 | Leopold et al. ............ 455/13.1 |

OTHER PUBLICATIONS

"NASA's Advanced Communications Technology Satellite (ACTS)", http://acts.grc.nasa.gov/.

* cited by examiner

Primary Examiner—Nay Maung
Assistant Examiner—Tanmay Lele
(74) Attorney, Agent, or Firm—Frank J. Bogacz (57) ABSTRACT

A communication system (20) utilizing a constellation (22) of satellites (24) is presented. A source ground station (52) transmits an uplink signal (34) containing source payload data (32) to a primary satellite (26) located in an orbit (70) about the Earth (56). The primary satellite (26) conveys the source payload data (32) to a secondary satellite (28) located proximate the primary satellite (26) in the orbit (70), where the source payload data (32) is baseband processed to produce destination payload data (42), which is then conveyed back to the primary satellite (26). The primary satellite (26) transmits a downlink signal (50) containing the destination payload data (42) to a destination ground station (54). The primary satellite (26) and secondary satellites are configured to expend majorities of their energy budgets in downlink transmissions and payload data processing, respectively.

15 Claims, 4 Drawing Sheets

COMMUNICATION SYSTEM UTILIZING A CONSTELLATION OF SATELLITES AND METHOD THEREFOR

TECHNICAL FIELD OF THE INVENTION

The present invention relates to the field of satellite communication. More specifically, the present invention relates to the field of satellite communication utilizing on-satellite baseband processing.

BACKGROUND OF THE INVENTION

High-frequency (e.g., microwave and millimeter-wave) communication typically requires a line-of-sight communication path. When a signal source and a signal destination are located on the surface of the Earth, the curvature of the Earth and other obstructions (terrain, etc.) impose a severe limitation on the line-of sight communication path.

The distance between the signal source and destination may be increased by incorporating one or more repeaters into the communication system. If the repeater is a satellite in orbit about the Earth, the potential distance between the signal source and the signal destination is significantly increased. If the satellite is located in a geosynchronous orbit—approximately 35,786 kilometers above the surface of the Earth—surface distances between signal source and signal destination in excess of forty-five percent of the circumference of the Earth (i.e., in excess of 18,000 kilometers) may be spanned. With the use of three geosynchronous equatorial satellites, therefore, any location on the surface of the Earth, other than in the extreme polar regions, may be reached.

A repeater satellite receives an uplink signal having a given payload data (intelligence), and transmits one or more downlink signals having substantially the same payload data. This is substantially a "bent-pipe" function, i.e., an upward-propagating signal is bent into a downward-propagating signal by the satellite.

To fulfill a wide variety of customer needs, a satellite-based communication system should be able to effect both point-to-point and point-to-multipoint communication services. Desirably, such a system would also be able to provide signal routing. Under certain conditions, it may be desirable to process the payload data of a given signal within a satellite. An example of this may be when a single uplink signal is to be transmitted as a different downlink signal to each of a plurality of signal destinations. In such a case, the payload data (intelligence) of each downlink signal may be radically different than the payload data of the originating uplink signal. To fulfill this need, the satellite must be able to demodulate the uplink signal into a baseband signal, process the source payload data to produce each destination payload data at the baseband level, and modulate the resultant baseband signals into the requisite downlink signals. Effecting this conversion and processing requires a considerable expenditure of energy.

The energy budget of a satellite is finite. In a "bent-pipe" operation, a significant portion of the energy budget is consumed in the transmission of the downlink signals, if the satellite is also to perform on-board baseband processing, then a significant portion of the energy budget is consumed effecting that processing. A compromise in the energy budget is therefore in order when a single satellite is to achieve both goals. Such a compromise satellite is exemplified by the NASA Advanced Communications Technology Satellite (ACTS) experiment, wherein the satellite used effected both "bent-pipe" and processing functions. While the ACTS satellite successfully demonstrated the technical viability of a satellite employing both bent pipe and baseband processing, it did not address the commercial viability of such a communication system.

Assuming for the sake of this discussion that a given satellite is placed in a geosynchronous orbit, then certain compromises on that satellite must be made. Ideally, the satellite will be optimized for each of three critical parameters: energy, mass, and cost.

Energy consumption generates heat. In space, this heat may be extracted only by radiation. For a given technology, as a satellite becomes more complex and performs more functions, the circuitry therein increases. The increased circuitry leads to an increase in the capacity and size of the power source to provide the additional energy. The increase in both the circuitry and the power source leads to an escalating increase in the overall mass of the satellite. Heat is a function of the energy consumption. Heat is therefore, indirectly, a function of the mass of the satellite. Since radiation is a function of surface area, a point is reached where an increase in satellite functionality (and mass) will exceed the satellite's ability to dissipate the resultant heat.

Mass poses other problems as well. The more massive a satellite is, the greater the cost of orbital insertion. Also, once inserted, the satellite must be maintained in attitude and position. This requires onboard fuel, engines, and control circuitry. As the mass of the satellite increases, its inertia increases. The resultant fuel consumption for maintenance burns therefore increases. Assuming a given satellite life, the overall quantity of fuel also increases, which increases the mass, etc. Again, a practical limit is soon reached.

One solution to the mass problem would be to reduce functionality per satellite, i.e., to use two identical satellites to achieve a given throughput. Another complication with identical satellites is the independent frequency plans on the transmit side. This would require two insertions for a given amount of functionality, thereby significantly increasing the cost. What is most desirable, then, is to use satellites that are optimized for energy, mass, and cost.

What is needed, therefore, is a communication system that serves both bent-pipe and baseband processing functions in an efficient and cost-effective manner.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 1 schematically depicts a communication system utilizing a constellation of satellites wherein one satellite provides downlink communication and another satellite provides baseband processing in accordance with preferred embodiments of the present invention;

DETAILED DESCRIPTION OF THE PREFERRED EMBODIMENTS

Figure 2:
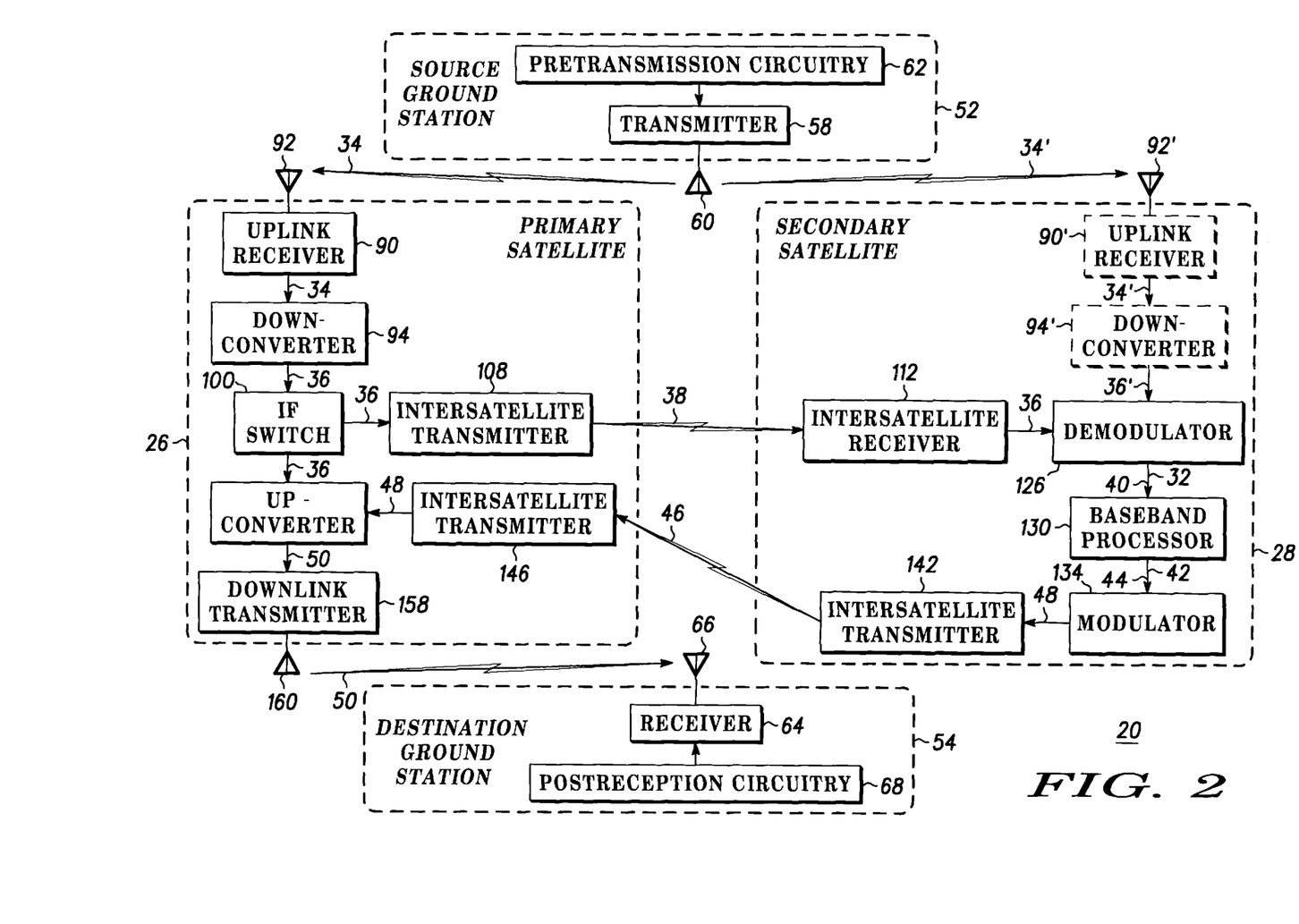
FIG. 2 shows a block diagram depicting the communication system of FIG. 1 in accordance with preferred embodiments of the present invention.
Figure 3:
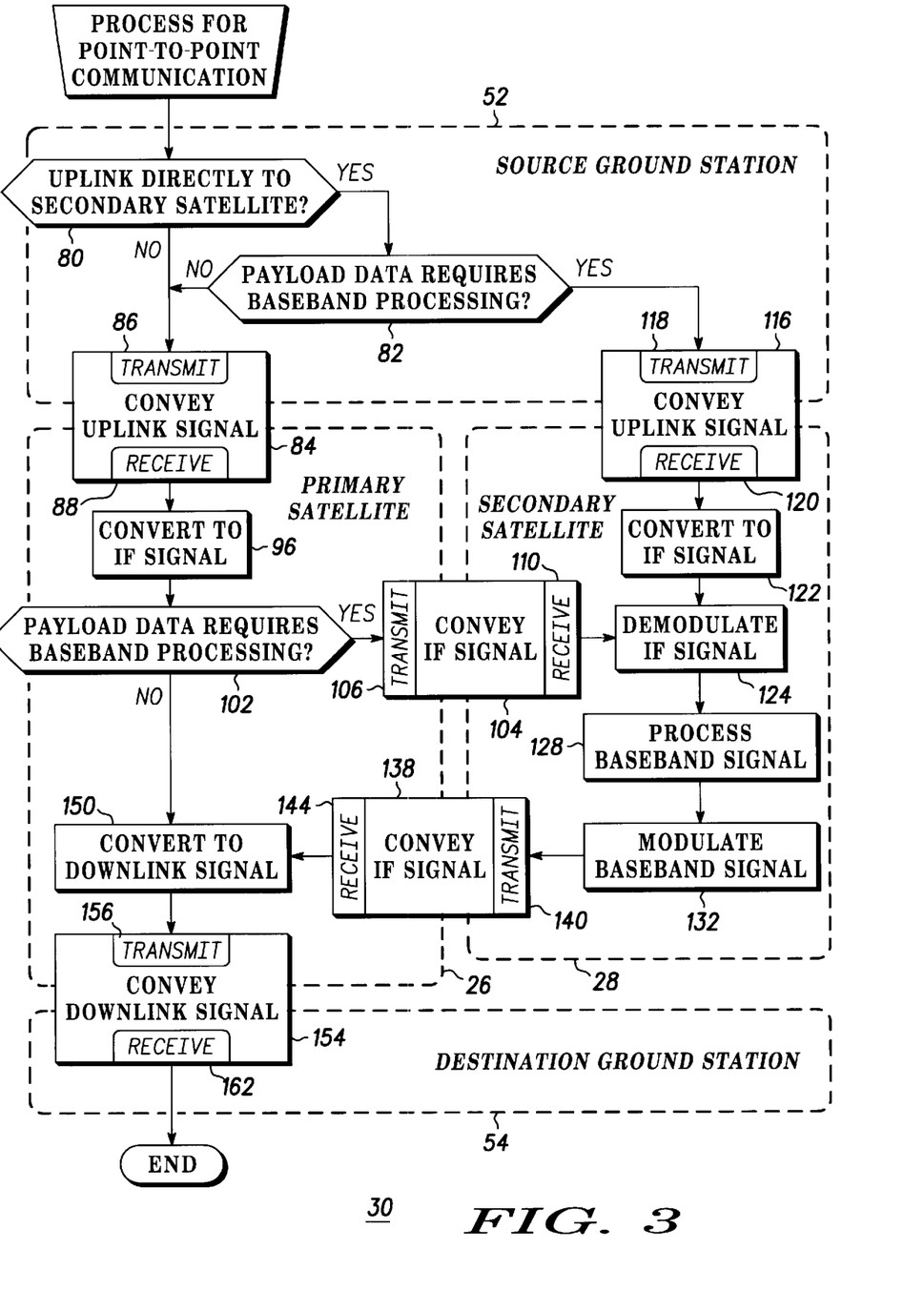
FIG. 3 shows a flowchart depicting the operation of the communication system of FIG. 1 in accordance with preferred embodiments of the present invention.
Figure 4:
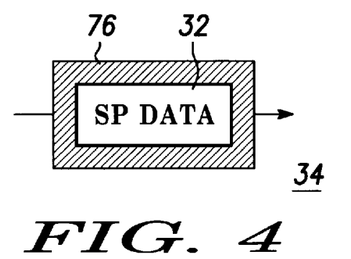
FIG. 4 shows a schematic representation of an uplink signal in accordance with preferred embodiments of the present invention.
Figure 5:
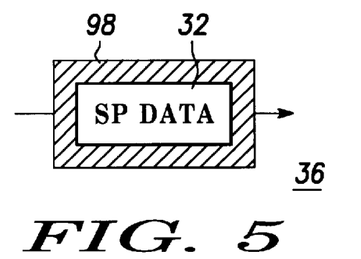
FIG. 5 shows a schematic representation of a source intermediate-frequency signal in accordance with preferred embodiments of the present invention.

In accordance with preferred embodiments of the present invention, FIG. 1 schematically depicts a communication system 20 utilizing a constellation 22 of Earth-orbiting satellites 24 wherein a primary satellite 26 provides downlink communication and a secondary satellite 28 provides baseband processing. FIG. 2 shows a block diagram depicting communication system 20. FIG. 3 shows a flowchart depicting a process 30 for the operation of communication system 20. FIGS. 4, 5, 6, and 7 show schematic representations of source payload data (SP DATA) 32 within an uplink signal 34, a source intermediate-frequency signal 36, a source intersatellite signal 38, and a source baseband signal 40, respectively. FIGS. 8, 9, 10, and 11 show schematic representations of destination payload data (DP DATA) 42 within a destination baseband signal 44, a destination intersatellite signal 46, destination intermediate-frequency signal 48, and a downlink signal 50, respectively. The following discussion refers to FIGS. 1 through 11.

Communication system 20 effects point-to-point and point-to-multipoint communication between a signal source 52 and signal destinations 54 utilizing a constellation 22 of satellites 24. Signal source 52 and signal destination 54 are both located upon or near the surface of the Earth 56.

For the purposes of this discussion, signal source 52 is assumed to be a source ground station 52 configured to transmit uplink (Earth-to-space) signal 34. Source ground station 52 incorporates an uplink transmitter 58 with an associated uplink transmission antenna 60, and all pretransmission signal-processing circuitry 62 preceding uplink transmitter 58. Similarly, signal destination 54 is assumed to be a destination ground station 54 configured to receive downlink (space-to-Earth) signal 50. Destination ground station 54 incorporates a downlink receiver 64 with an associated downlink reception antenna 66, and all postreception signal-processing circuitry 68 following downlink receiver 64.

For purposes of simplicity, this discussion assumes that source and destination ground stations 52 and 54 are located on or near the surface of the Earth 56, and that no direct signal path exists between source and destination ground stations 52 and 54. Communication system 20 uses constellation 22 having at least two cooperating satellites 24 in orbit about the Earth 56 to effect both "bent-pipe" and baseband-processing communications between multiple ones source and destination ground station 52 and 54 for a multiplicity of customers utilizing system 20.

This discussion also assumes that source and destination ground stations 52 and 54 are located on or near the surface of the Earth 56 so that communication system 20 has line-of-sight signal paths between primary satellite 26 of constellation 22 and each of source and destination ground stations 52 and 54. If orbit 70 is a geosynchronous orbit—approximately 35,786 kilometers above the surface of the Earth 56—a downlink footprint of greater than 254,000,000 square kilometers may be realized.

Those skilled in the art will appreciate that if source and destination ground stations 52 and 54 are too far apart on the surface of the Earth 56 (e.g., in excess of 18,000 kilometers when orbit 70 is a geosynchronous orbit), then one or more additional "bent-pipe" satellites 24 may be used to effect communication. The use of such additional satellite(s) 24 does not depart from the spirit of the present invention.

Constellation 22 has at least two satellites 24 in orbit 70 about the Earth 56. Primary satellite 26 provides downlink communication to destination ground station 54. That is, primary satellite 26 transmits substantially all downlink signals 50 received by any destination ground station 54. Secondary satellite 28 provides onboard baseband processing of source payload data 32 to produce destination payload data 32. Source payload data 32 is the intelligence of those signals propagating from source ground station 52. Destination payload data 42 is the intelligence of those signals propagating to destination ground station 54.

In addition to source and destination payload data 32 and 42, uplink and downlink signals may contain control data (not shown). Control data is that data that is relevant to the intrinsic operations of satellite 24. That is, control data is that data that effects/reports attitude, orbital, and other corrections, and alters/reports modes of operation, channel assignments, and other on-board orbital and communication housekeeping tasks of satellite 24. Source and destination payload data 32 and 42, on the other hand, is data that is substantially irrelevant to the intrinsic operations of satellites 24. That is, source and destination payload data 32 and 42 is primarily relevant to the customers of system 20, and has substantially no effect upon the operation of satellites 24. Secondary satellite 28 processes source payload data 32 to produce destination payload data 42 and, except for the energy consumed and heat generated thereby, is unaffected by source and destination payload data 32 and 42.

Those skilled in the art will appreciate that source and destination payload data 32 and 42 are therefore distinct and separate from control data. It is known that, in certain cases, source and/or destination payload data 32 and/or 42 and control data may co-exist in the same uplink signal 34 and/or downlink signal 50. For the sake of simplicity, however, this discussion concerns itself with signals containing the payload data. The use of signal-intelligence schemes other than those described herein does not depart from the spirit of the present invention.

Primary and secondary satellites 26 and 28 share orbit 70. Primary satellite 26 is located at a first position 72 in orbit 70. Secondary satellite 26 is located at a second position 74 in orbit 70 proximate primary satellite 26. This allows primary and secondary satellites 26 and 28 to maintain a substantially fixed spatial relationship relative to each other. Desirably, locations 72 and 74 are as closely proximate each other within orbit 70 as is practical without engendering a danger of collision between primary and secondary satellites 26 and 28, and without incurring exorbitant expenses in positioning and station keeping.

Desirably, orbit 70 is a geosynchronous orbit, thereby allowing primary and secondary satellites 26 and 28 to maintain substantially fixed spatial relationships relative to source and destination ground stations 52 and 54. Additionally, primary and secondary satellites 26 and 28 are each optimized for geosynchronous orbit, i.e., have appropriate energy/mass/cost relationships. In this manner, an efficient number of both "bent-pipe" and baseband processing communications may be achieved by system 20.

Those skilled in the art will appreciate that an orbit 70 other than a geosynchronous orbit may be utilized without departing from the spirit of the present invention.

Communication system 20 utilizes a point-to-point and point-to-multipoint communication process 30 (FIG. 3) to effect a typical communication from source ground station 52 to one or more destination ground stations 54. Those skilled in the art will appreciate that communication process 30 may be expanded and extended to encompass schemes other than point-to-point and point-to-multipoint without departing from the spirit of the present invention.

Source ground station 52 is configured to transmit uplink signal 34 (FIGS. 1, 2, and 4) containing source payload data (SP DATA) 32, i.e., uplink signal 34 has an uplink carrier 76 modulated with source payload data 32. Similarly, destination ground station 54 is configured to receive downlink signal 50 (FIGS. 1, 2, and 11) containing destination payload data (DP DATA) 42, i.e., downlink signal 50 has a downlink carrier 78 modulated by destination payload data 42.

If source payload data 32 is not to be baseband processed by secondary satellite 28, then primary satellite serves as a "bent-pipe" repeater and destination payload data 42 is substantially identical to source payload data 32. If, on the other hand, source payload data 32 is to be baseband processed, then destination payload data 42 may differ markedly from source payload data 32.

Source ground station 52 and primary satellite 26 are implemented to communicate directly, i.e., source ground station 52 may transmit uplink signal 34 containing source payload data 32 directly to primary satellite 26. Within source ground station 52, a query task 80 (FIG. 3) determines if source ground station 52 may transmit uplink signal 34 containing source payload data 32 directly to secondary satellite 28. If source ground station 52 and secondary satellite 28 are implemented so as to not communicate directly, then query task 80 may be thought of as being implemented negatively in hardware, i.e., query task 80 determines in hardware that source ground station 52 may not transmit uplink signal 34 directly to secondary satellite 28.

If query task 80 determines that source ground station 52 may transmit uplink signal 34 directly to secondary satellite 28, then a query task 82 (FIG. 3) determines if source payload data 32 contained within uplink signal 34 requires baseband processing, which is desirably accomplished within secondary satellite 28.

If query task 80 determines that source ground station 52 may not transmit uplink signal 34 directly to secondary satellite 28, or if query task 82 determines that the source payload data contained therein does not require baseband processing, then a task 84 (FIG. 3) conveys uplink signal 34 from source ground station 52 to primary satellite 26. In a subtask 86 (FIG. 3) within conveying task 84, uplink transmitter 58 within source ground station 52 transmits uplink signal 34 via uplink transmission antenna 60. In a subtask 88 (FIG. 3), also within conveying task 84, an uplink receiver 90 within primary satellite 26 receives uplink signal 34 via an uplink reception antenna 92.

In a down-converter 94 within primary satellite 26, a task 96 (FIG. 3) then down-converts uplink signal 34 (FIGS. 1, 2, and 4) into a source intermediate-frequency signal 36 (FIGS. 2 and 5) containing source payload data 32, i.e., source intermediate-frequency signal 36 has a source intermediate-frequency carrier 98 modulated with source payload data 32. Those skilled in the art will appreciate that other conversion methods may be used without departing from the spirit of the present invention.

In an intermediate-frequency signal switch 100, a query task 102 (FIG. 3) determines if source payload data 32 is to be baseband processed. Those skilled in the art will appreciate that this determination need not be an in-line and active process. For example, certain channels in intermediate-frequency signal switch 100 may be dedicated to those signals that are to be baseband processed, allocation of those channels having been previously made via control data. The decision to baseband process specific source payload data 32 is made in pretransmission circuitry 62 (FIG. 2) of source ground station 52 by assigning uplink signal 34 containing that source payload data 32 to one of the dedicated channels.

Figure 6:
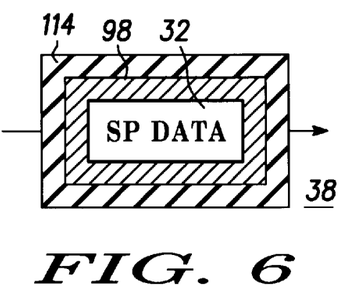
FIG. 6 shows a schematic representation of a source intersatellite signal in accordance with preferred embodiments of the present invention.

If query task 102 determines that source payload data 32 is to be baseband processed, then a task 104 (FIG. 3) conveys source intermediate-frequency signal 36 from primary satellite 26 to secondary satellite 28. In a subtask 106 (FIG. 3) within conveying task 104, an intersatellite transmitter 108 within primary satellite 26 transmits source intermediate-frequency signal 36 (containing source payload data 32) as source intersatellite signal 38 (FIGS. 2 and 6). In a subtask 110 (FIG. 3), also within conveying task 104, an intersatellite receiver 112 within secondary satellite 28 receives source intersatellite signal 38 as source intermediate-frequency signal 36.

Preferably, intersatellite transmitter 108 in primary satellite 26 and intersatellite receiver 38 in secondary satellite 28 together form a free-space optical transmission link configured to convey source intersatellite signal 38 and source payload data 32 contained therein. In simplest terms, for example, intersatellite transmitter 108 may modulate a source laser beam 114 with source intermediate-frequency signal 36 and transmit source laser beam 114 as source intersatellite signal 38. Intersatellite receiver 112 then receives source laser beam 114 as source intersatellite signal 38 and demodulates source laser beam 114 to extract source intermediate-frequency signal 36 therefrom.

Significant advantages are realized by using source laser beam 114 to convey source intersatellite signal 38 from primary satellite 26 to secondary satellite 28. With secondary satellite 28 proximate primary satellite 26 in orbit 70, only a minimal transmission power is required to effect signal conveyance. Also, since lasers are capable of significant collimation, multiple lasers of identical frequencies may be used by constellation 22 and other satellites without interference. Those skilled in the art will appreciate, however, that the use of another technique to convey source intermediate-frequency signal 36 from primary satellite 26 to secondary satellite 28 does not depart from the spirit of the present invention.

If query task 80 determines that source ground station 52 may transmit uplink signal 34 directly to secondary satellite 28 and query task 82 determines that source payload data 32 contained therein requires baseband processing, then a task 116 (FIG. 3) conveys an uplink signal 34' (FIGS. 1 and 2) from source ground station 52 to secondary satellite 28. In a subtask 118 (FIG. 3) within conveying task 116, uplink transmitter 58 (FIG. 2) within source ground station 52 transmits uplink signal 34' via uplink transmission antenna 60. In a subtask 120 (FIG. 3), also within conveying task 116, an uplink receiver 90' within secondary satellite 28 receives uplink signal 34 via an uplink reception antenna 92'.

In a down-converter 94' within secondary satellite 28, a task 122 (FIG. 3) then down-converts uplink signal 34 into a source intermediate-frequency signal 36' containing source payload data 32.

Those skilled in the art will appreciate that uplink receiver 90', uplink reception antenna 92', and down-converter 94' within secondary satellite 28 are optional circuits analogous to uplink receiver 90, uplink reception antenna 92, and down-converter 94 within primary satellite 26. Similarly, uplink signal 34' and source intermediate-frequency signal 36' associated with and within secondary satellite 28 are optional signals analogous to uplink signal 34 and source intermediate frequency signal 36 associated with and within primary satellite 26. It will also be appreciated that optional signals 34' and 26' and optional circuits 90', 92', and 94' merely reflect an alternative approach and are not a requirement of the present invention. The use of these or other signals and circuits for obtaining a source intermediate-frequency signal does not depart from the spirit of the present invention.

Figure 7:
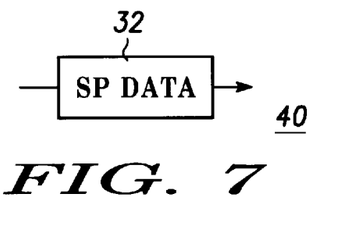
FIG. 7 shows a schematic representation of a source baseband signal (source payload data) in accordance with preferred embodiments of the present invention.

In a task 124 (FIG. 3), a demodulator 126 in secondary satellite 28 demodulates one of source intermediate-frequency signals 36 and 36' to produce source baseband signal 40 (FIGS. 2 and 7). Source baseband signal 40 contains and substantially is source payload data 32 contained in uplink signal 34 transmitted by source ground station 52.

Figure 8:
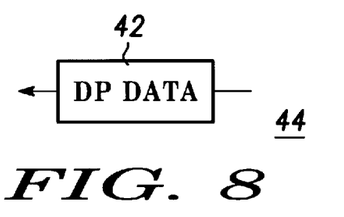
FIG. 8 shows a schematic representation of a destination baseband signal (destination payload data) in accordance with preferred embodiments of the present invention.

In a task 128 (FIG. 3), a baseband processor 130 in secondary satellite 28 processes source baseband signal 40 as required to produce destination baseband signal 44 (FIGS. 2 and 8). Destination baseband signal 44 contains and substantially is destination payload data 42 to be contained within downlink signal 50 as received by destination ground station 54.

In a task 132 (FIG. 3), a modulator 134 then modulates destination baseband signal 44 to produce a destination intermediate-frequency signal 48 (FIGS. 2 and 10) containing substantially destination payload data 42, i.e., destination intermediate-frequency signal 48 has a destination intermediate-frequency carrier 136 modulated with destination payload data 42.

Tasks 126, 128, and 132 work together to baseband process source payload data 32 and produce destination payload data 42. Baseband processing therefore consists of demodulating, processing (i.e., manipulating), and modulating the payload data. The payload data may take any desired form, often having elaborate error correction and encoding schemes, and considerable hardware and/or software may be required to demodulate, decode, manipulate, encode, and modulate the data. This may involve thousands or even millions of circuit functions, and may represent a significant expenditure of energy within secondary satellite 28. It is often desirous that this be performed at high speeds for each channel being processed in secondary satellite 28 (e.g., in real time), thereby markedly increasing the energy expenditure.

Those skilled in the art will appreciate that, once demodulated, the payload data may be manipulated in any desired manner by baseband processor 130. Data evaluation and routing are typical of such manipulations. It will also be appreciated that often a single source baseband signal 40 containing source payload data 32 may be manipulated to produce a plurality of destination baseband signals 44 containing destination payload data 42. For purposes of simplicity, this discussion continues with the assumption of a single destination baseband signal 44 intended for a single destination ground station 54. It will be appreciated that, when multiple destination baseband signals 44 intended for independent destination ground stations 54 are present, each destination baseband signal 44 proceeds as described herein to its appropriate destination ground station 54.

Figure 9:
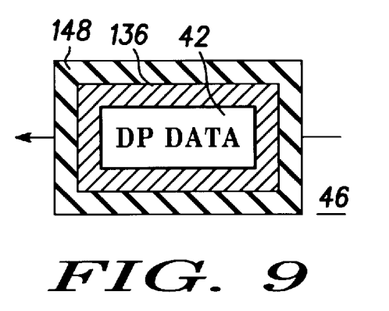
FIG. 9 shows a schematic representation of a destination intersatellite signal in accordance with preferred embodiments of the present invention.
Figure 10:
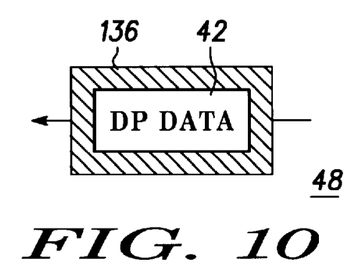
FIG. 10 shows a schematic representation of a destination intermediate-frequency signal in accordance with preferred embodiments of the present invention.

A task 138 (FIG. 3) conveys destination intermediate-frequency signal 48 from secondary satellite 28 to primary satellite 26. In a subtask 140 (FIG. 3) within conveying task 138, an intersatellite transmitter 142 within secondary satellite 28 transmits destination intermediate-frequency signal 48 (containing destination payload data 42) as destination intersatellite signal 46 (FIGS. 2 and 9). In a subtask 144, also within conveying task 138, an intersatellite receiver 146 within primary satellite 26 receives destination intersatellite signal 46 as destination intermediate-frequency signal 48.

Preferably, intersatellite transmitter 142 in secondary satellite 28 and intersatellite receiver 146 in primary satellite 26 together form a free-space optical transmission link configured to convey destination intersatellite signal 46 and destination payload data 42 contained therein. In simplest terms, for example, intersatellite transmitter 108 may modulate a destination laser beam 148 with destination intermediate-frequency signal 48 and transmit destination laser beam 148 as destination intersatellite signal 46. Intersatellite receiver 112 then receives destination laser beam 148 as destination intersatellite signal 46 and demodulates destination laser beam 148 to extract destination intermediate-frequency signal 48 therefrom.

As described hereinbefore in connection with source intersatellite signal 38, significant advantages are realized by using destination laser beam 148 to convey destination intersatellite signal 46 from secondary satellite 28 to primary satellite 26. Those skilled in the art will appreciate, however, that the use of another technique to convey destination intermediate-frequency signal 48 from secondary satellite 28 to primary satellite 26 does not depart from the spirit of the present invention.

Figure 11:
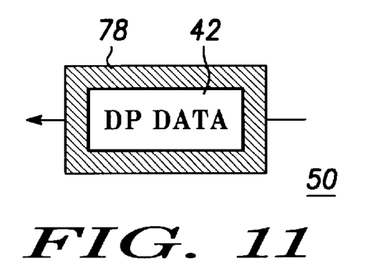
FIG. 11 shows a schematic representation of a downlink signal in accordance with preferred embodiments of the present invention.

In a task 150 (FIG. 3), an up-converter 152 within primary satellite 26 up-converts source intermediate-frequency signal 36 or destination intermediate-frequency signal 48 into downlink signal 50 (FIGS. 1, 2, and 11). In particular, if query task 82 and query task 102 have determined that source payload data 32 did not require baseband processing, then task 150 converts source intermediate-frequency signal 36 into downlink signal 50, and destination payload data 42 is substantially identical to source payload data 32. That is, primary satellite 26 acts as a "bent-pipe" satellite.

Alternatively, if query task 82 or query task 102 has determined that source payload data 32 did require baseband processing, then task 150 converts destination intermediate-frequency signal 48 into downlink signal 50, and destination payload data 42 is as produced by the baseband processing of source payload data 32 within secondary satellite 28. Destination payload data 42 may therefore differ markedly from source payload data 32.

A task 154 (FIG. 3) then conveys downlink signal 50 from primary satellite 26 to source ground station 52. In a subtask 156 (FIG. 3) within conveying task 154, a downlink transmitter 158 within primary satellite 26 transmits downlink signal 50 via a downlink transmission antenna 160. In a subtask 162 (FIG. 3), also within conveying task 154, downlink receiver 64 within destination ground station 54 receives downlink signal 50 via downlink reception antenna 66.

In the scenario discussed hereinbefore for communication process 30, an assumption was made that task 128 processed source baseband signal 40 (i.e., source payload data) in into destination baseband signal 40 (i.e., destination payload data). Those skilled in the art will appreciate that this is a simplification for exemplary purposes only. In many cases, source baseband signal 40 may be processed into a plurality of destination baseband signals 40, each of which potentially contains different destination payload data 42, each of which is modulated in task 132 to an independent destination intermediate-frequency signal 48, each of which is conveyed in task 134 to primary satellite 26, each of which is converted in task 150 to an independent downlink signal 50, each of which is then conveyed in task 154 to one or more destination ground stations 54. It may readily be seen that for one uplink signal 34 from one source ground station 52, while downlink signal 50 may be a signal downlink signal 50 and destination ground station 54 may be a single destination ground station 54 receiving that single downlink signal 50, downlink signal 50 may also be one of a plurality of downlink signals 50 and destination ground station 54 may be one of a plurality of destination ground stations 54 wherein each destination ground station 54 receives one of the plurality of downlink signals 50.

It is well known to those skilled in the art that, in a conventional "bent-pipe" satellite, a majority of a satellite energy budget is spent in the transmission of downlink signals. That is, over the life of the satellite, the energy required for receiving and converting uplink signals is less than the energy required to transmit corresponding downlink signals.

It has also been demonstrated that, in a multipurpose satellite such as the experimental Advanced Communications Technology Satellite (ACTS) of the National Aeronautics and Space Administration (NASA), when a satellite effects baseband processing, a significant portion of the satellite energy budget will be consumed by that baseband processing. Indeed, the portion of the satellite energy budget consumed by baseband processing is comparable to the portion of the satellite energy budget consumed by a large number of downlink transmissions and greater than all other portions of the total satellite energy budget. Because of this, such a multipurpose satellite is neither an effective and efficient "bent-pipe" repeater nor an effective and efficient baseband processor. The use of multiple multipurpose satellites would exacerbate this problem by creating constellations where no satellite is efficient. Maximizing energy/mass/cost for such a constellation would be problematic.

Through the use of a constellation 22 containing primary and secondary satellites 26 and 28 described hereinbefore, the present invention offers an improvement in both effectiveness and efficiency. Primary satellite 26 serves as the downlink to satellite 24 and has no significant onboard baseband processing capability. Primary satellite 26 is therefore able to dedicate a majority (i.e., greater than fifty percent) of a primary-satellite energy budget over the life of constellation 22 to the transmission of downlink signals 50 in a conventional manner. This majority is at least seventy percent and typically greater than ninety percent of the total primary-satellite energy budget over the life of constellation 22.

Primary satellite 26, while able to serve as a conventional "bent-pipe" repeating satellite, is not limited to that function. Through the use of short-range, low-power intersatellite communication, primary satellite 26 and secondary satellite 28 are together able to provide on-board baseband processing without significantly impacting the primary-satellite energy budget. This enables primary satellite 26 to maintain the high throughput of a typical "bent-pipe" satellite without compromise.

Secondary satellite 28, in contrast to primary satellite 26, maintains little or no downlink transmission capabilities. Therefore, little or none of a secondary-satellite energy budget over the life of constellation 22 is expended in downlink communication. Secondary satellite 28 is therefore able to dedicate a majority (i.e., greater than fifty percent) of the secondary-satellite energy budget to the processing of baseband signals, i.e., in converting source payload data 32 into destination payload data 42. This majority is at least seventy percent and typically greater than ninety percent of the total secondary-satellite energy budget over the life of constellation 22.

With greater than seventy percent of their energy budgets dedicated to downlink transmissions and baseband processing, primary and secondary satellites 26 and 28, respectively, are easily optimized for energy/mass/cost considerations.

Additionally, since primary satellite 26 functions as a conventional "bent-pipe" satellite 24, primary satellite may be inserted into orbit 70 first. Primary satellite 26 may function solely as a "bent-pipe" repeater, thereby producing revenue, until secondary satellite is readied and inserted. By not requiring that both primary and secondary satellites 26 and 28 be immediately operational prior to the production of revenue, insertion costs and the engineering risks associated therewith are significantly reduced.

Those skilled in the art will appreciate that, when orbit 70 is equatorial and geosynchronous, communication system 20 may be made circumterrestrial if constellation 22 has three equipollent and equidistant satellites 24 able to receive uplink signals 34 from source ground stations 52 and each other, and to transmit downlink signals 50 to destination ground stations 54 and each other. Each of these three satellites 24 is therefore able to serve as a "bent-pipe" repeater either between source and destination ground stations 52 and 54, or between either source or destination ground station 52 or 54 and another satellite 24.

Any one of these three satellites 24 may also serve as primary satellite 26 in close communication with a fourth satellite 24 within constellation 22 serving as secondary satellite 28. In such a configuration, communication system 20 can provide either "bent-pipe" or baseband processing communication between any two locations upon the surface of the Earth 56 except the extreme arctic and antarctic regions. Also, since only an estimated ten percent of the multiplicity of communications handled by constellation 22 would require baseband processing, only one secondary satellite 26 would be necessary to handle worldwide baseband processing requirements. Primary and secondary satellites 26 and 28, working together with two purely "bent-pipe" satellites 24, would therefore provide an efficient and effective use of satellite resources to effect both "bent-pipe" signal repetition and on-board baseband processing world wide.

In summary, the present invention teaches a point-to-point and point-to-multipoint communication system 20 capable of both "bent-pipe" signal repetition and on-board baseband signal processing. The present invention also teaches an effective and efficient process for using communication system 20 utilizing a primary satellite 26 and a secondary satellite 28 to effect communication between a source ground station 52 and a destination ground station 54. The present invention also teaches a circumterrestrial embodiment of communication system 20 utilizing a primary satellite 26, a secondary satellite 28, and two conventional "bent-pipe" repeating satellites 24 in an equatorial geosynchronous orbit 70 about the Earth 56. The present invention teaches a primary satellite 26 configured to transmit substantially all downlink signals 50 and a secondary satellite configured to process substantially all uplink signals 34 requiring baseband processing.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A communication system utilizing a constellation of satellites to transmit messages between a source ground station configured to transmit an uplink signal containing source payload data and a plurality of destination ground stations configured to receive a multiplicity of downlink signals, said communication system comprising:

a primary satellite comprising an uplink receiver and a downlink transmitter, wherein the primary satellite is configured to receive said source payload via said uplink signal at said unlink receiver, and to transmit one of said multiplicity of downlink signals to one of said plurality of destination ground said downlink transmitter and a secondary satellite comprising:

a demodulator configured to demodulate a source intermediate-frequency signal containing said source payload data into said source baseband signal containing said source payload data:

a processor configured to process said source baseband signal to produce a destination baseband signal containing destination payload data in response to said source payload data;

a modulator configured to modulate said destination baseband signal into a destination intermediate-frequency signal containing said destination payload data; and an intersatellite transmitter configured to provide the destination intermediate-frequency signal to said primary satellite.

2. A communication system as claimed in claim 1 wherein:

said primary satellite is configured to expend a majority of a primary-satellite energy budget in transmitting said multiplicity of downlink signals during a lifetime of said constellation of satellites; and said secondary satellite is configured to expend a majority of a secondary-satellite energy budget in baseband processing payload data to be contained in a plurality of said multiplicity of said downlink signals during a lifetime of said constellation of satellites.

3. A communication system as claimed in claim 1 wherein:

said primary satellite is located at first position in an orbit about the Earth, and said secondary satellite is located at a second position in said orbit.

4. A communication system as claimed in claim 3 wherein said orbit is a geosynchronous orbit.

5. A communication system as claimed in claim 1 wherein said secondary satellite additionally comprises an intersatellite receiver configured to receive said source intermediate-frequency signal from said primary satellite.

6. A communication system as claimed in claim 1 wherein said secondary satellite additionally comprises:

an uplink receiver configured to receive said uplink signal from said source ground station; and a down-converter configured to convert said uplink signal into said source intermediate-frequency signal.

7. A communication system as claimed in claim 1 wherein said primary satellite comprises:

an intersatellite receiver configured to receive a destination intermediate-frequency signal containing said destination payload data from said secondary satellite;

an up-converter configured to convert said destination intermediate-frequency signal into said one downlink signal; and a downlink transmitter configured to transmit said one downlink signal to said one destination ground station.

8. A communication system as claimed in claim 7 wherein said primary satellite additionally comprises:

an uplink receiver configured to receive said uplink signal from said source ground station;

a down-converter configured to convert said uplink signal into a source intermediate-frequency signal containing said source payload data; and an intersatellite transmitter configured to transmit said source intermediate-frequency signal to said secondary satellite.

9. A communication system as claimed in claim 1 wherein an intersatellite transmitter in a first one of said primary and secondary satellites and an intersatellite receiver in a second one of said primary and secondary satellites together comprise a free-space optical transmission link configured to convey said payload data.

10. A method of communication utilizing a constellation of satellites comprising a primary satellite having an unlink receiver and a downlink transmitter and a secondary satellite having a processor for processing inter-satellite transmissions, said method comprising the steps of:

a) conveying an uplink signal containing source payload data from a source ground station to the primary satellite;

b) providing the source payload data to the secondary satellite in a source baseband c) processing said source baseband signal in said processor to produce a destination baseband signal containing destination payload data;

d) transferring the destination baseband signal from the secondary satellite to the primary satellite; and e) conveying a downlink signal containing said destination payload data from said primary satellite to a destination ground station.

11. A method as claimed in claim 10 additionally comprising:

converting said uplink signal into a source intermediate-frequency signal containing said source payload data prior to said providing step b).

12. A method as claimed in claim 10 wherein said providing activity b) comprises:

e) converting said uplink signal into a first intermediate-frequency signal containing said source payload data; and f) conveying, when said conveying activity a) conveys said uplink signal to said primary satellite, said first intermediate-frequency signal from said primary satellite to said secondary satellite.

13. A method as claimed in claim 10 wherein:

said providing activity b) and said transferring activity d) convey said first and second intermediate-frequency signals between said primary and secondary satellites utilizing lasers.

14. A communication method as claimed in claim 10 wherein said conveying activity e) comprises:

transmitting said downlink signal from said primary satellite; and receiving said downlink signal at said destination ground station.

15. A point-to-point communication system utilizing a constellation of satellites, said communication system comprising:

a source ground station configured to transmit an uplink signal containing source payload data;

a primary satellite located at a first position in an orbit about the Earth, said primary satellite expending greater than fifty percent of its energy in transmitting a multiplicity of downlink signals containing destination payload data during a lifetime of said constellation, and said primary satellite comprising:

an uplink receiver configured to receive said uplink signal from said source ground station;

an up-converter configured to convert said uplink signal into a source intermediate-frequency signal containing said source payload data;

an intersatellite transmitter configured to transmit said source intermediate-frequency signal;

an intersatellite receiver configured to receive a destination intermediate-frequency signal containing said destination payload data;

a down-converter configured to convert said destination intermediate frequency signal into one of said multiplicity of downlink signals, said one downlink signal containing said destination payload data; and a downlink transmitter configured to transmit said one downlink signal;

a secondary satellite located at a second position in said orbit said secondary satellite expending greater than fifty percent of its energy in producing said destination payload data for each of said multiplicity of said downlink signals during said lifetime of said constellation, and said secondary satellite comprising:

an intersatellite receiver configured to receive said source intermediate-frequency signal from said primary satellite;

a demodulator configured to demodulate said source intermediate-frequency signal into a source baseband signal containing said source payload data;

a processor configured to process said source baseband signal to produce a destination baseband signal containing said destination payload data for said one downlink signal in response to said source payload data;

a modulator configured to modulate said destination baseband signal into said destination intermediate-frequency signal; and an intersatellite transmitter configured to transmit said destination intermediate-frequency signal so said primary satellite; and a destination ground station configured to receive said one downlink signal from said primary satellite.

\* \* \* \* \*

UNITED STATES PATENT AND TRADEMARK OFFICE
CERTIFICATE OF CORRECTION

PATENT NO.    : 6,745,006 B2
DATED         : June 1, 2004
INVENTOR(S)   : James T. Shaneyfelt It is certified that error appears in the above-identified patent and that said Letters Patent is hereby corrected as shown below:

Column 11,
Line 27, insert -- station via -- after "ground".

Column 12,
Line 44, insert -- signal -- after "baseband".

Signed and Sealed this

Seventh Day of September, 2004

JON W. DUDAS
*Director of the United States Patent and Trademark Office*